Patented Mar. 15, 1938

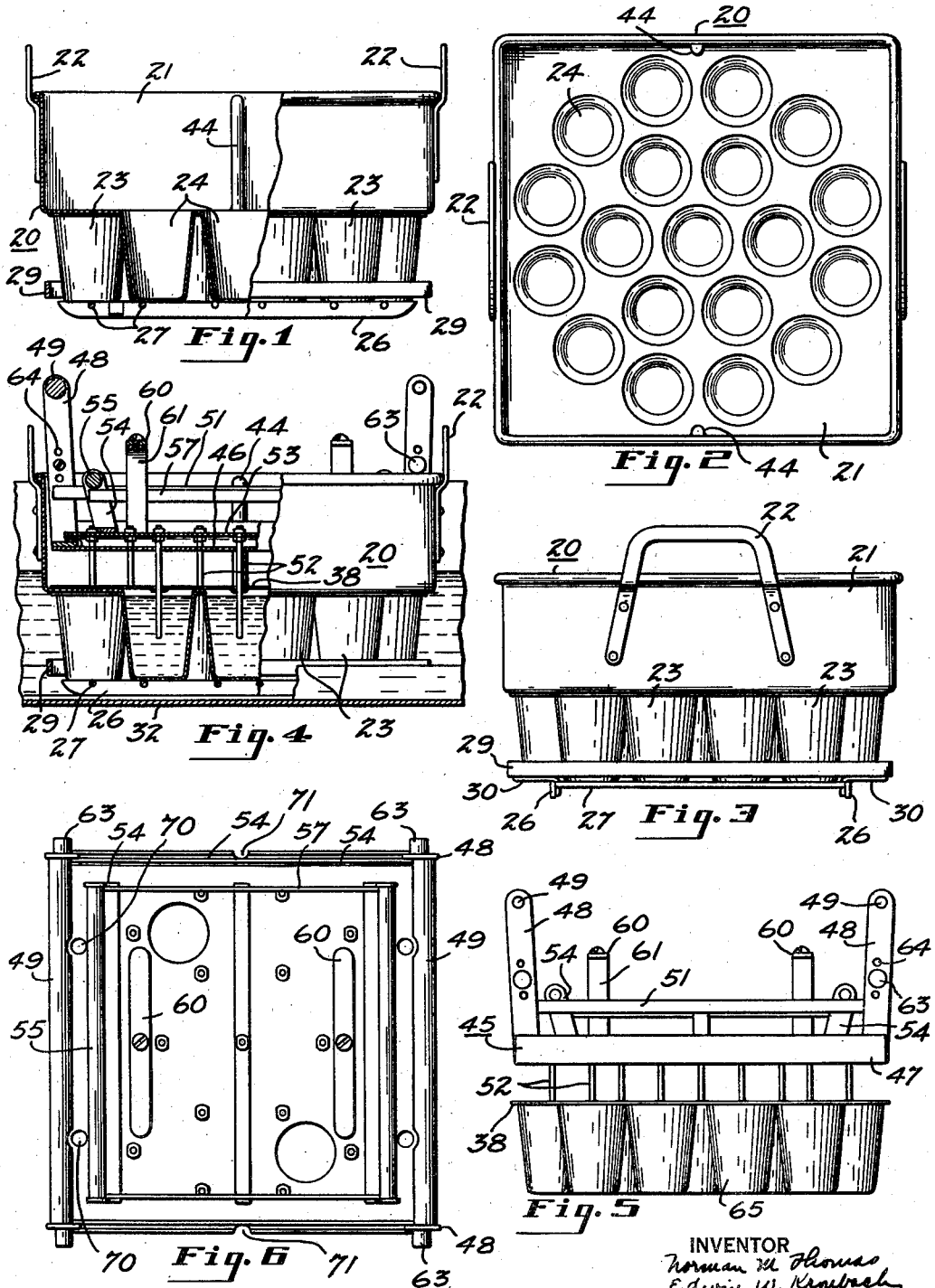

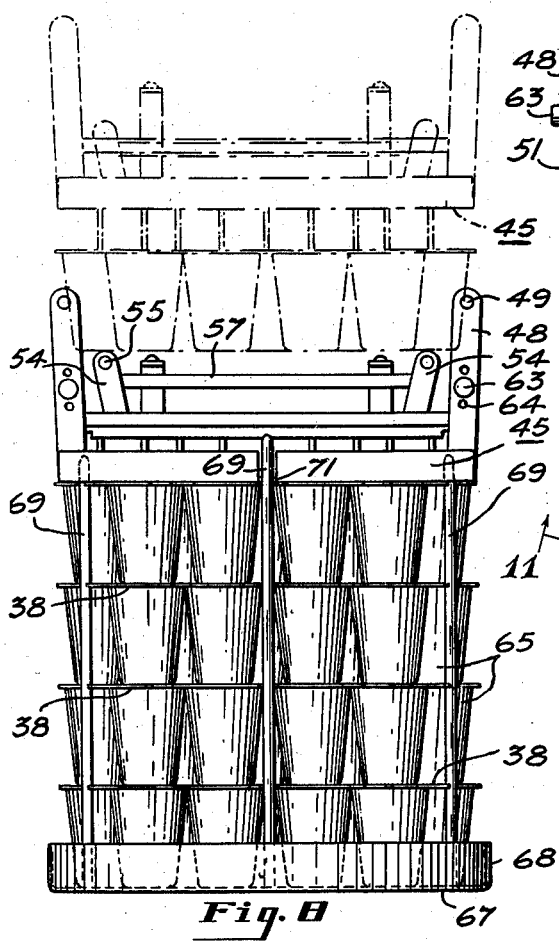
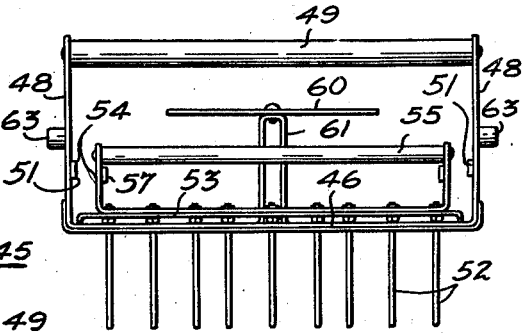
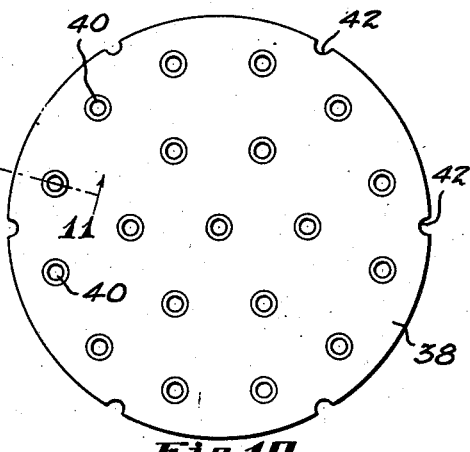
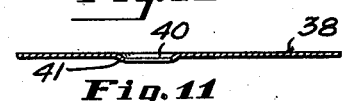
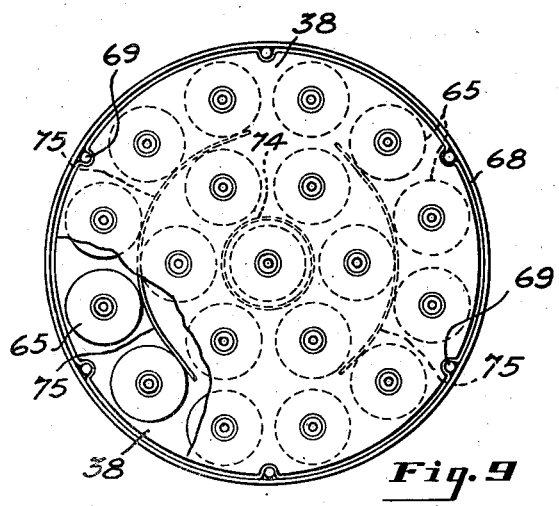
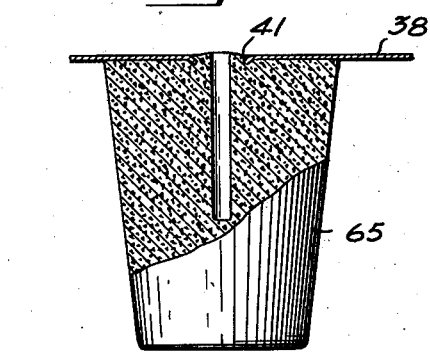

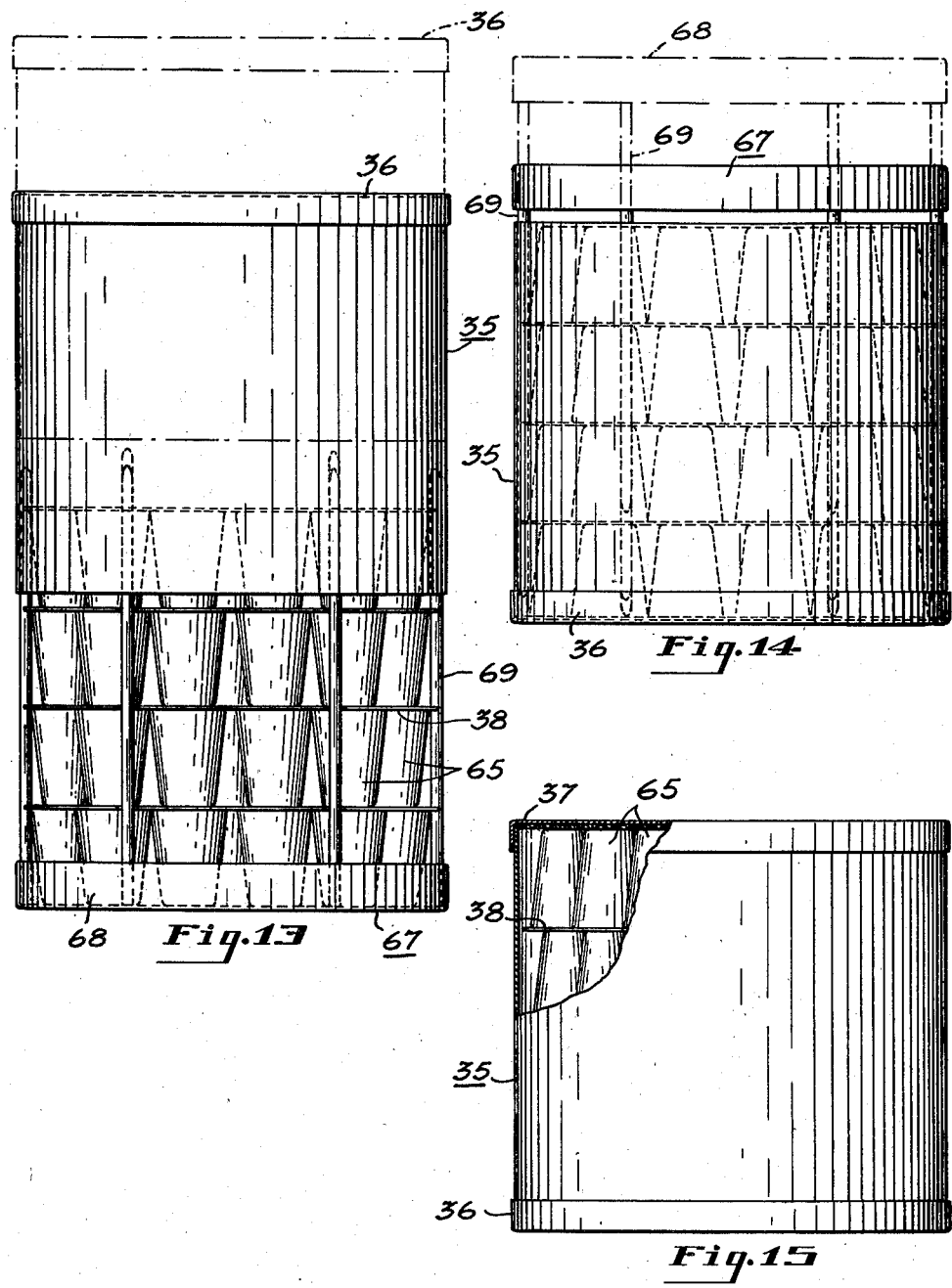

2,111,498

UNITED STATES PATENT OFFICE 2,111,498

ART OF FORMING, REFRIGERATING, AND HARVESTING FROZEN CONFECTIONS

Norman M. Thomas, Brooklyn, N. Y., and Edwin W. Kronbach, Cleveland Heights, Ohio, assignors to Warren H. F. Schmieding, Columbus, Ohio Application August 4, 1933, Serial No. 683,578
Renewed August 4, 1937

17 Claims. (Cl. 99—137)

The present invention relates to the art of forming, refrigerating and packaging unitary frozen confections, such as, ice cream, sherbets, water ices, etc.

One of the objects of the present invention is to provide an improved method of and apparatus for forming, refrigerating and packaging frozen confection. In carrying out this object, further objects of the invention are: To provide for freezing a confection mix in individual mold cavities and causing the frozen confections to adhere to a common spacer which maintains the unitary confections spaced from one another; to provide for simultaneously withdrawing the confections from the mold cavities with the spacer attached to the frozen confections; to provide for locating a plurality of spacers with confections attached for the ready packaging of a plurality of spacers and confections in a single carton; to utilize the means for withdrawing the confections as means for holding and moving the spacer and attached confections in receiving relation with the locating rack.

Another object of the invention is to provide a spacer having projections extending into the confection for maintaining the confection in spaced relation.

A further object is to provide a spacer having perforations for locking or buttoning engagement with the frozen confections.

A still further object is to provide a packaged frozen confection including a carton containing a plurality of layers of spacers, each having a plurality of confections attached thereto in spaced relation.

Other and further objects and advantages will be apparent from the following disclosure, reference being had to the accompanying drawings wherein a preferred form of embodiment of the present invention is clearly shown.

In the drawings:

Fig. 1 is a side view partly in section showing a preferred type of mold;

Fig. 2 is the top plan view of the mold;

Fig. 3 is a side view thereof;

Fig. 4 shows the mold in a tank which may be a brine tank for freezing purposes or a tank containing warm water for defrosting purposes. In this figure the mold is shown partly in section and there is also shown a confection lifting rack in position;

Fig. 5 is a side view of the lifting rack showing the confections adhered to the lifting pins;

Fig. 6 is a top plan view of the lifting rack;

Fig. 7 is a side view of the lifting rack;

Fig. 8 is a side view of a locating rack showing a plurality of confections in position and showing, in full lines, the lifting rack in position for locating a set of confections in the rack and showing in dot and dash lines the lifting rack being applied to the locating rack;

Fig. 9 is the top plan view of the locating rack showing confections therein;

Fig. 10 is a top plan view of a spacer disk which is utilized to support a plurality of confections in spaced relation;

Fig. 11 is a sectional view taken on line 11—11 of Fig. 10 but on a larger scale;

Fig. 12 is a view similar to Fig. 11 showing a confection attached to the spacer disk;

Fig. 13 is a side view of the locating rack containing sets of confections and showing a carton being applied thereto;

Fig. 14 shows the carton and locating rack inverted in which position the locating rack is withdrawn and Fig. 15 is a side view of the carton, part thereof being broken away to show the confections therein.

The present invention contemplates apparatus for and a method of providing cartons of individual pieces or units of frozen confections which can be dispensed individually, the individual pieces having been previously formed to the desired shape and size. In carrying out this invention, the mix which may be either an ice cream, sherbet, water ice, frozen custard, etc., is placed in individual molds of the desired shape and size and these molds are then subjected to a freezing temperature to cause solidification of the mix. It is desirable to maintain the frozen confection in spaced apart relation so that they cannot freeze to one another and preferably a spacer is frozen to the mix at the time of the freezing of the mix so that when the frozen confections are withdrawn from the individual molds, the spacer will maintain the individual pieces separated from one another. The set of confections just formed, with the spacer attached thereto, is then placed in a locating rack with like sets. This spacing rack maintains the sets in position so that a carton may be readily slid over the sets of confections. Preferably the apparatus used for removing the confections from the mold is also utilized to hold or move the set of confections and spacer into receiving relationship with the locating rack. After the desired number of sets of confections are placed in the locating rack, a carton with one end only in place is slid over the locating rack. The carton and the locating rack are then inverted so as to permit the withdrawal of the locating rack. After this the other end of the carton may be applied.

Referring to the drawings in detail and particularly to sheet 1 there is shown a mold structure 20 including a pan 21 having handles 22 and depending cups 23 which form mold cavities 24. Runners 26 are attached to the opposite sides of the mold structure 20 and to the bottoms of the side cups 23 and these runners are interconnected by rods 27, which rods are also attached to the bottoms of the intermediate cups. These runners provide a sled for the mold structure 20 and cooperate with the rods 27 to reinforce the bottom of the mold structure. A protecting shield 29 surrounds the lower part of the cups to prevent mutilation of the cups when a plurality of mold structures are used simultaneously. This shield 29 is secured to the runners 27 by narrow brackets 30.

A quantity of mix is placed in the pan 21 sufficient at least to substantially fill the mold cavities 24 and any excess may be removed from the pan by means of a squeegee (not shown). The mold is then subjected to a freezing temperature to solidify the mix and preferably the mix is placed in a tank 32 containing a brine solution. The runners 26 rest on the bottom of the tank and may be slid along from one end of the tank to the other if, for example, the freezing process is timed in accordance with the movement of the molds in the brine tank.

The confections formed in the mold are placed in a carton similar to that shown in Fig. 15. These cartons may be any desirable shape and size but preferably they are cylindrical and of such size as to fit within the cans of ice cream cabinets. The carton 35 includes a bottom 36 and top 37 and the individual frozen confections are placed in layers or tiers within the carton. The layers of confection are separated by spaces in the form of discs 38 which also form spacing elements for spacing the individual frozen confections of a layer from one another. The spacer or separator 38 must be attached to the frozen confection in order to prevent shifting of the frozen confections in the carton and in the preferred form herein shown the spacers are attached to the frozen confection at the time of the freezing of the confections and this is accomplished by resting the spacer on the bottom of the pan 21 during the freezing of the mix.

Referring to the detail of the spacer as shown in Figs. 10, 11, and 12, it will be noted that the spacer is circular in form and is provided with a series of perforations 40 spaces to coincide with the mold cavities 24. The walls of the spacer forming the perforations 40 extend downwardly as at 41. In order to properly locate the spacer in the pan 21, the spacer is provided with a series of notches 42, two of which receive permanent projections 44 which extend throughout the depth of the pan 21. When the mix in the mold cavities 24 freezes, it expands slightly and thereby extends itself through the perforations 40 and in that manner locks or buttons the confection to the spacer 38 as is clearly shown in Fig. 12. It will be noted that the confection projects a short distance above the walls 41 and also that the walls 41 are embedded in the frozen confection. In this manner the confections are held in position on the spacer with sufficient security as to not separate from the spacer except when it is desirable to intentionally remove the same or perhaps by an abnormal jar.

A lifting rack is used for removing the frozen confections from the mold 20 by causing depending pins thereof to adhere to the frozen confection. These pins can be inserted into the mix at any time but it is preferable to extend the pins into the mix directly after the mix is placed in the mold. The lifter rack 45 comprises a base plate 46 having turned up sides 47 to which are attached uprights 48 carrying handle bars 49, and these uprights 48 are tied together by reinforcing tie strips 51. Base plate 46 is perforated to receive pins or rods 52. These pins or rods are loosely carried by a plate 53 and are spaced from one another to coincide with the centers of the mold cavities 24. Uprights 54 are attached to the plate 53 and carry at their upper ends handle bars 55 and these uprights 54 are also tied together by reinforcing tie strips 57. The handle bars 49 and 55 at one side of the mold structure are placed in such a position that an operator may grasp both with one hand. The handle bars 49 and 55 at the other side of the mold structure are likewise positioned so that the operator may grasp both with the other hand. Then by closing the hand these handle bars 49 are moved toward bars 55 so that the plate 53 is moved upwardly relative to plate 46. The frozen confections clinging to the pins 42 will engage the under side of plate 46 and then by the addition of more pressure of the hands, the pins 52 will be pulled away from the confections.

In operation, after the confection is frozen, the mold 20 is removed by the handles 22 from the brine tank and then the lower part of the mold is immersed momentarily in warm water which may be contained in a tank similar to tank 32. After the bonds between the confection and the walls of the cups 23 are broken by slightly melting the confections, the confections can be removed from the cups 23 by pulling upwardly on the handle bars 49 of the lifter rack 45. The operator then grasps a set of handle bars 49 and 55 in one hand and the other set in the other hand and pulls the handle bars 55 upwardly causing the spacer 38 to engage the under side of plate 46 and then by further movement, the spacer with the confections attached thereto are separated from the pins 52. In order to prevent the pins 52 from being withdrawn from the perforated plate, stops 60 arrest the upward movement of the plate 53. The stops 60 comprise strips of material which are secured to upright posts 61 and these posts are of such height as to arrest the movement of the plate 53 before the pins are withdrawn from the openings in the plate 46. It has been discovered that the bond between the pins 52 and the confection varies in accordance with the temperature of the brine. At extremely cold temperatures the bond between the pins 52 and the confection is such that it is difficult to withdraw the pins when substantial parts of the pins extend into the confections. When the brine is relatively warm, the pins 52 must extend a substantial distance into the confection in order to insure sufficient bond to bear the weight of the confection and overcome the friction offered by the mold when removing the confection from the mold. In order to adjust the depth to which the pins 52 extend into the frozen confection, adjustable depth stops 63 are provided on each of the uprights 48. These depth stops are each adapted to be fixed to one of three holes 64 in the upright 48. The stops 63 extend outwardly so as to engage the upper edge of the pan 21.

The set of confections, including the spacer 38 with the confections 65 attached thereto, may be placed directly in the carton but in the preferred form it is desirable to first place the sets of confection and the spacer therefor in a locating rack 67. This locating rack comprises a bottom cup 68 having 6 upright rods 69 attached thereto. The rods 69 are placed so as to coincide with the notches 42 in the spacer 38 for the purpose of guiding the spacer and maintaining the confections in proper position. The plates 46 and 53 of the lifter rack 45 are provided with spaced holes 70 and the plate 46 is notched at 71 for receiving the rods 69 and preferably two opposed rods are a trifle longer than the other four to facilitate registering of the rods 69 and the openings 70 and notches 71 in the lifter rack 45. After the frozen confections are removed from mold cavities 24 the lifter rack is moved above and slid downwardly over the rods 69 of the locating rack 67. Then the operator grasps the handle bars 55 and pulls upwardly thereon to cause the pins 52 to separate from the frozen confections. At this time the notches 42 receive the rods 69 and in this manner the spacer with the confections attached thereto is held in position in the locating rack. After sufficient sets of confection are placed in the locating rack 67, the open end of a carton 35 is slid over the rods 69. At this time the upper end of the carton is closed. These cartons are preferably made of a paper material and although this paper is heavy it may tend to bulge and the six upright rods 69 maintain the cartons substantially cylindrical when it is being applied so that it will readily receive the discs 38. The carton together with the locating rack 67 is then inverted and then the rack 67 is withdrawn after which the lid 37 is securely fastened in position. The carton should be of such size as to tightly embrace the confections at the top and bottom and the disc 38 should snugly fit within the carton.

In order to prevent the crushing of the lowermost confections due to the weight of the confections thereabove, it is desirable to place lateral or vertical spacers between the discs or spacers 38. Any form of lateral spacer may be employed and in Fig. 10, two such forms are shown. One of these forms comprises a pasteboard sleeve 74 which surrounds the center confection and another form comprises two pasteboard sectors 75 interposed between the outermost circle and the next adjacent circle of confections. These separators all extend vertically a slight distance above the top of the confections.

The frozen confections must be readily and easily removable from the spacer 38 and therefore it is desirable that the confections be held in place solely or mainly at the center part thereof by the buttoning or locking effect as set forth in the foregoing. In this manner, tongs may be used for removing the confections individually from the spacer. The tongs can be fashioned to slide below the confection and grip the vertically extending sides of the confection. Then with a slight pull the button of ice cream is pulled from the spacer. The spacer may be made of any suitable material, and it has been found that a paper material covered with paraffine functions satisfactorily. A preferred paper material comprised a virgin sulphite base known to the trade as a double bond lined chipboard, and such paper of .024–.030 in thickness when paraffined had sufficient stability for handling as herein required. The paraffin coating on the paper prevented tight adhesion of the confection and paper and in this manner the confections are locked with the paper mainly by the locking effect of the outturned edges 41 and the buttoning effect of the confection with the holes 40.

From the foregoing it is apparent that there has been provided an improved method of an apparatus for forming, refrigerating and packing individual or unitary pieces of confection which are maintained separately from one another and thereby dispensed without the usual dipping or cutting of the confection.

While the form of mechanism herein shown and described constitutes a preferred embodiment of my invention, it is to be understood that other forms may be adopted all coming within the scope of the following claims.

What we claim is as follows:

1. The method of forming, refrigerating and packaging unitary frozen confections which consists in freezing a mix in individual mold cavities and freezing the confections to a common spacer so that the confections are supported spaced from one another, and then packaging the confections spaced from one another by inclosing the common spacer with the confections adhered thereto.

2. The method of forming, refrigerating and packaging unitary frozen confections which consists in freezing a mix in individual mold cavities and causing the confection to adhere during freezing to a common spacer so that the confections are supported spaced from one another, and then packaging the confections spaced from one another by inclosing a plurality of spacers with the confections adhered thereto in layer formation.

3. The method of forming, refrigerating and packaging unitary frozen confections which consists in freezing a mix in individual mold cavities and causing the confection to adhere to a common spacer so that the confections are supported spaced from one another when withdrawn from the mold cavities, causing individual withdrawing means to adhere to the confections by congelation of the mix simultaneously with the freezing of the mix, simultaneously withdrawing the confections adhered to the spacer from the mold cavities by the withdrawing means, removing the withdrawing means from the confection and then packaging the confections spaced from one another by inclosing the common spacer with the confections adhered thereto.

4. The method of forming, refrigerating and packaging unitary frozen confections which consists in freezing a mix in individual mold cavities and causing the confections to adhere to a common spacer so that the confections are supported spaced from one another when removed from the mold cavities, placing a plurality of spacers with the confections adhered thereto in layer formation in a locating rack, and then placing the located spacers and confections in a carton.

5. The method of forming, refrigerating and packaging unitary frozen confections which consists in freezing a mix in individual mold cavities and causing the confections to adhere to a common spacer so that the confections are supported spaced from one another when removed from the mold cavities, placing a plurality of spacers with the confections adhered thereto in layer formation in a locating rack, placing a carton about the located spacers and confection, and then withdrawing the rack from the carton.

6. The method of forming, refrigerating and packaging unitary frozen confections which consists in freezing a mix in individual mold cavities and causing the confections to adhere to a common spacer so that the confections are supported spaced from one another when removed from the mold cavities, causing individual withdrawing means to adhere to the confection by congelation of the mix simultaneously with the freezing of the mix, utilizing the withdrawing means for withdrawing the frozen confections from the mold cavities and for placing the confections adhered to the spacer in a locating rack.

7. The method of forming, refrigerating and packaging unitary frozen confections which consists in freezing a mix in individual mold cavities and causing the confections to adhere to a common spacer so that the confections are supported spaced from one another when removed from the mold cavities, causing individual withdrawing means to adhere to the confection by congelation of the mix simultaneously with the freezing of the mix, utilizing the withdrawing means for withdrawing the frozen confections from the mold cavities and for placing the confections adhered to the spacer in a locating rack, and then placing a carton about the rack containing a plurality of spacers and confections adhered thereto.

8. The method of forming, refrigerating and packaging unitary frozen confections which consists in freezing a mix in individual mold cavities and causing the confections to adhere to a common spacer so that the confections are supported spaced from one another when removed from the mold cavities, causing individual withdrawing means to adhere to the confection by congelation of the mix simultaneously with the freezing of the mix, utilizing the withdrawing means for withdrawing the frozen confections from the mold cavities and for placing the confections adhered to the spacer in a locating rack, and then placing a carton about the rack containing a plurality of spacers and confections adhered thereto, and then withdrawing the rack from the carton.

9. An article of manufacture comprising a paper-like plate having spaced irregular portions and a plurality of individual pieces of frozen confections frozen to the plate at the irregular portions.

10. An article of manufacture comprising a paper-like plate having spaced perforations and a plurality of individual pieces of frozen confection, each confection having a projecting portion extending through the perforation and overlapping on the side of the plate opposite the confection, the projecting portion including the overlapping part thereof being frozen to the plate.

11. An article of manufacture comprising a paper-like plate having spaced perforations the material of the plate at the edge of the perforations extending outwardly and a plurality of frozen confections frozen to the said material, each confection having a projecting portion extending through a perforation and overlapping the said material on the side thereof opposite the main body of the confection, the projecting portion including the overlapping part thereof being frozen to the said material.

12. The method of forming and packaging unitary congealed confections which consists in causing mix to congeal in individual mold cavities and causing the individual confections to adhere substantially simultaneously during congelation thereof to a common spacer so that all the confections are supported spaced from one another, and then packaging the confections spaced from one another by inclosing the common spacer with the confections adhered thereto.

13. The method of forming, refrigerating and packaging unitary frozen confections which consists in freezing a mix in individual mold cavities and causing the confection to adhere during freezing to a common spacer substantially simultaneously so that all the confections are supported spaced from one another when withdrawn from the mold cavities, simultaneously withdrawing the confections and the spacer adhered thereto from the mold cavities, and then packaging the confections spaced from one another by inclosing the common spacer with the confections adhered thereto.

14. An article of manufacture comprising a paper-like plate having spaced irregular portions and spaced perforations, and a plurality of individual pieces of frozen confection frozen to the plate at the irregular portions, each confection having a projecting portion extending into and frozen to the walls of that part of the plate forming a perforation.

15. An article of manufacture comprising a paper-like plate having spaced irregular portions and spaced perforations, and a plurality of individual pieces of frozen confections frozen to the plate at the irregular portions, each confection having a projecting portion extending through a perforation and overlapping on the side of the plate opposite the confection, the projecting portion of the confection including the overlapping part thereof being frozen to the plate.

16. An article of manufacture comprising a paper-like plate having spaced perforations and a plurality of individual pieces of frozen confection each confection having a projecting portion extending into and frozen to the walls of that part of the plate forming a perforation.

17. An article of manufacture comprising a paper-like plate having spaced perforations the material of the plate at the edge of the perforations extending outwardly and a plurality of frozen confections frozen to the said material, each confection having a projecting portion extending into and frozen to the walls of that part of the plate forming a perforation.

EDWIN W. KRONBACH.
NORMAN M. THOMAS.